United States Patent [19]

Le Pesant et al.

[11] Patent Number: 4,818,052

[45] Date of Patent: Apr. 4, 1989

[54] DEVICE FOR OPTICAL SWITCHING BY FLUID DISPLACEMENT AND A DEVICE FOR THE COMPOSITION OF A LINE OF POINTS

[75] Inventors: Jean-Pierre Le Pesant, Gif Sur Yvette; Michel Hareng, La Norville; Jean-Pierre Huignard, Paris; Jean-Pierre Herriau, Orsay; Bruno Mourey, Boulogne Billancourt; Jean-Noël Perbet, Gif Sur Yvette, all of France

[73] Assignee: Thomson-CSF, Paris, France

[21] Appl. No.: 43,263

[22] Filed: Apr. 21, 1987

Related U.S. Application Data

[63] Continuation of Ser. No. 625,866, Jun. 28, 1984, abandoned.

[30] Foreign Application Priority Data

Jul. 4, 1983 [FR] France ............................ 83 11074

[51] Int. Cl.$^4$ .......................... G02B 6/26; G02B 6/42
[52] U.S. Cl. ................................................ 350/96.15
[58] Field of Search ............... 350/96.15, 267, 584; 250/573, 574, 575

[56] References Cited

U.S. PATENT DOCUMENTS

| 4,229,071 | 10/1980 | d'Auria et al. | 350/150 |
| 4,505,539 | 3/1985 | Auracher et al. | 350/96.15 |
| 4,525,709 | 6/1985 | Hareng et al. | 340/719 |
| 4,543,662 | 9/1985 | Huignard et al. | 455/600 |
| 4,569,575 | 2/1986 | Le Pesant et al. | 350/355 |
| 4,636,785 | 1/1987 | Le Pesant | 340/753 |

OTHER PUBLICATIONS

Runyan; "Electrostatic Liquid Display Devices"; *IBM Technical Disclosure Bulletin;* vol. 22, No. 1; 6/79, p. 325.

*Primary Examiner*—William L. Sikes
*Assistant Examiner*—Robert E. Wise
*Attorney, Agent, or Firm*—Pollock, Vande Sande & Priddy

[57] ABSTRACT

In a device for switching a light beam, the conditions of propagation of the beam are modified locally under electric control by interposing on the beam path a fluid which modifies the conditions of refraction of the medium traversed by the beam.

18 Claims, 6 Drawing Sheets

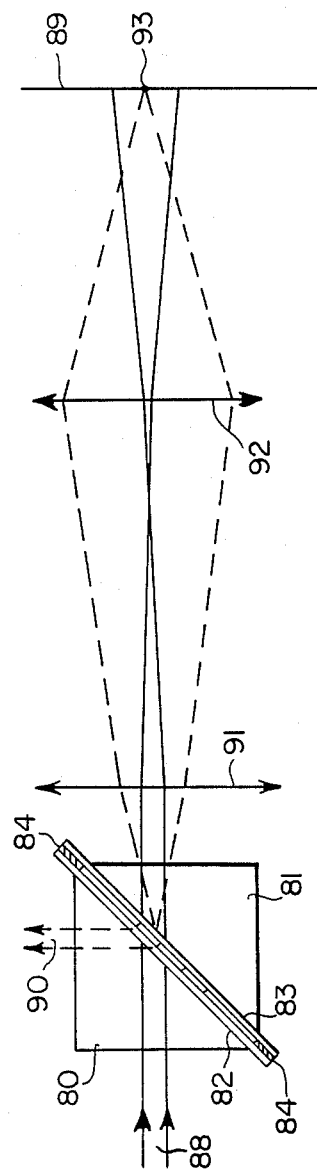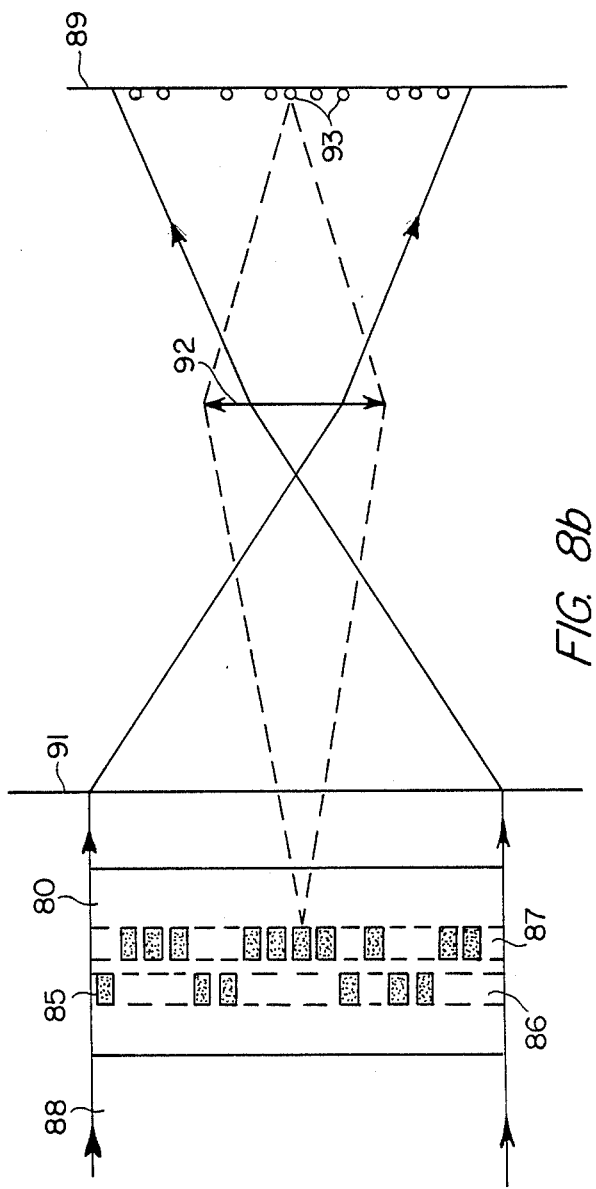

DEVICE FOR OPTICAL SWITCHING BY FLUID DISPLACEMENT AND A DEVICE FOR THE COMPOSITION OF A LINE OF POINTS

This is a continuation of co-pending application Ser. No. 625,866 filed on June 28, 1984, now abandoned.

BACKGROUND OF THE INVENTION

1. Field of the Invention

The present invention relates to devices for high-speed switching of a light beam, in particular when said light beam carries coded data. One of the particular applications of the invention is the switching of light between optical fibers.

2. Description of the Prior Art

A few solutions to the problem of optical switching have already been found but encounter considerable difficulties in regard to their use and potential application to multiple-beam and miniaturization devices, especially when such devices are based on the movements of mirrors controlled by electromechanical impulses.

Devices of the prior art which are worthy of mention include structures which utilize wavelength multiplexing in order to provide subscribers with a number of different services of the videocommunications type on a single multimode optical fiber. These structures are based on the principle of spatial deflection of an optical beam by mirrors which perform the multiplexing functions. These structures entail the need to employ a plurality of optical beams having different wavelengths as well as mirrors consisting of semireflecting plates which introduce losses and have not-negligible dimensions (scarcely less than one square centimeter).

In another known type of device, deflection of light beams is produced by total reflection of light within electrooptical crystals. A device of this type is described in the article entitled "Linear total internal reflection spatial light modulator for laser printing" by Sprague, Turner and Flores, published in the SPIE review, Vol. 229: Advances in Laser Scanning Technology (1981), p. 68-75. The disadvantage of these devices lies in the crystal itself which usually consists of lithium niobate. For reasons of purity, the crystal is available only in small dimensions, which means that the electrodes which are carried by the crystal and serve to apply a control elecric field to this latter will have a very small pitch. In consequence, it will be necessary to provide the device with extensive optical systems. Furthermore, the crystal reacts only slightly to the electric field, thus entailing the need for high control voltages.

SUMMARY OF THE INVENTION

In order to overcome these drawbacks, the invention proposes to employ the movements of very small volumes of fluid which are controlled electrically without resorting to the use of moving mechanical elements in order to produce a local modification in the conditions of refraction encountered by the light beams which propagate within the device. These modifications in refraction make it possible to displace the paths of the light beams and thus to achieve switching between different propagation channels, especially between optical fibers. The switching devices contemplated by the invention comprise electric control means for controlling the displacement of a fluid whereby very small volumes or globules of said fluid are permitted to flow from one region to another under the action of propulsion forces of electrical origin arising from local electric field variations which are produced by applying voltage steps to control electrodes.

The object of the invention is therefore to provide a device for optical switching of at least one incident light beam by electrically controlled switching means having the design function of placing on the path of the light beam either a first fluid for producing a reflection of the beam or a second fluid for permitting transmission of the beam. Said fluids are contained within a confinement space defined by transparent elements, are not miscible, and have different dielectric permittivities. One fluid has a globular structure embedded in the interstitial structure of the other fluid. The device further comprises means for including an electric field gradient in order to cause the fluid which has the highest permittivity to converge toward a region of the confinement space which is subjected to the electric field.

The invention also relates to a device for composing a line of points, comprising an optical switching device as defined in the foregoing and optical means for producing an image on a projection plane.

BRIEF DESCRIPTION OF THE DRAWINGS

Other features of the invention will be more apparent upon consideration of the following description and accompanying drawings, wherein:

FIGS. 8a and 8b illustrate a device for composing a line of luminous points in accordance with the invention.

DESCRIPTION OF THE PREFERRED EMBODIMENTS

In accordance with the preferred embodiments of the invention, the control electrodes are placed opposite to each other in pairs in order to form capacitors which delimit the volume of influence of the electric field produced by the potential difference established between the electrodes of the pair considered. In order to make suitable use of the surface tension and capillary forces, a preferred arrangement within the scope of the invention consists in employing pairs of control electrodes located at short distances from each other, typically of the order of 1 μm to 1 mm. The volume of fluid displaced by virtue of the action produced by the pairs of electrodes can advantageously be split up into separate globules comparable with "drops" flattened by compression between the confinement surfaces which carry the control electrodes. The operation in accordance with the invention utilizes the possibility of lining the confinement surfaces with a non-wettable coating which prevents excessive spreading, in the form of a thin film, of the fluid whose position it is desired to control. The fluid being thus split-up into separate globules, the invention utilizes the possibility of displacing each globule from one stable position to another stable position, solely by electrical means. The stability of these positions is obtained on the one hand be effects of capillarity and inertia related to the geometry and dimensions of devices which can be constructed in accordance with the invention and on the other hand by applying suitable electric potentials to the pairs of electrodes.

Figure 1:
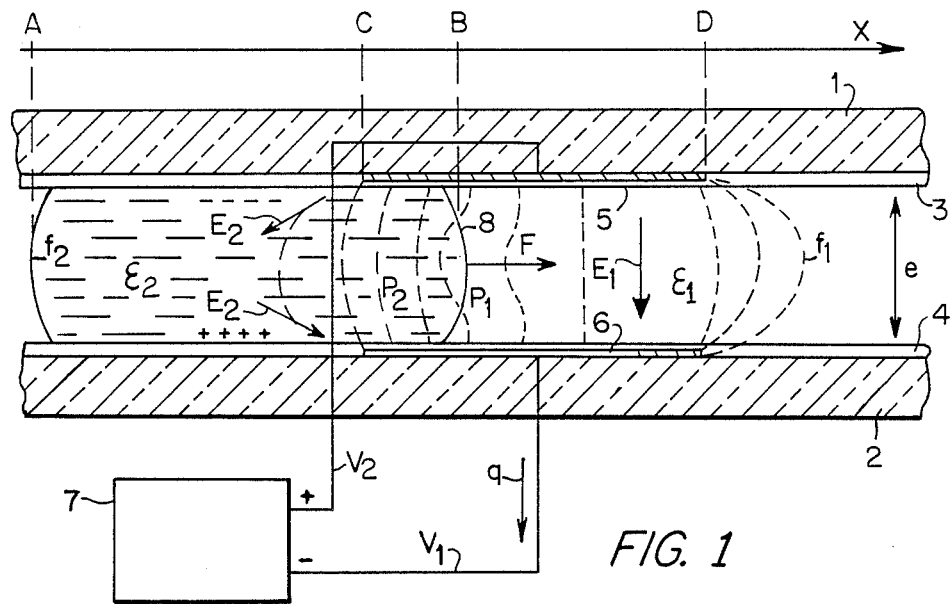
FIGS. 1 and 2 are explanatory diagrams.
Figure 2:
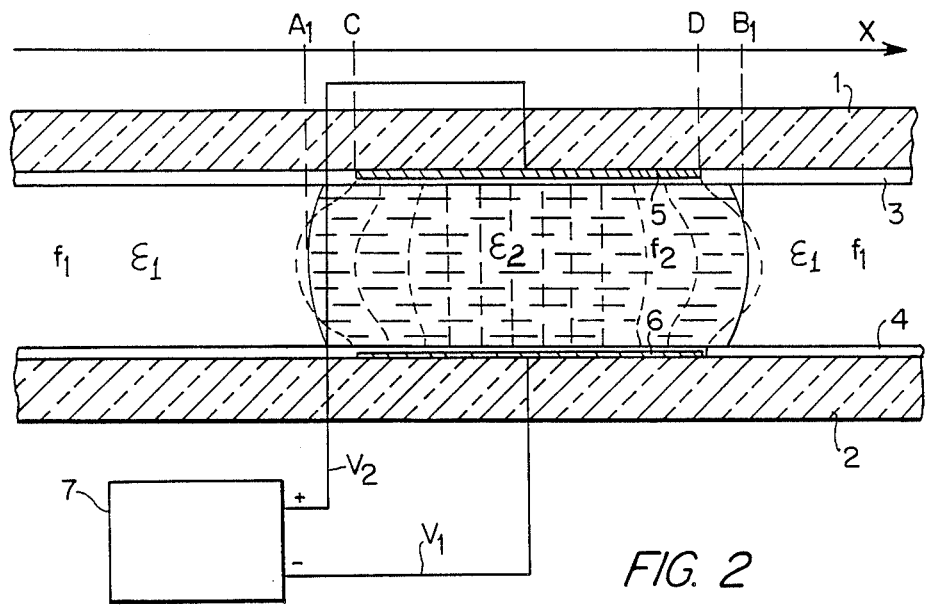
Figure 3:
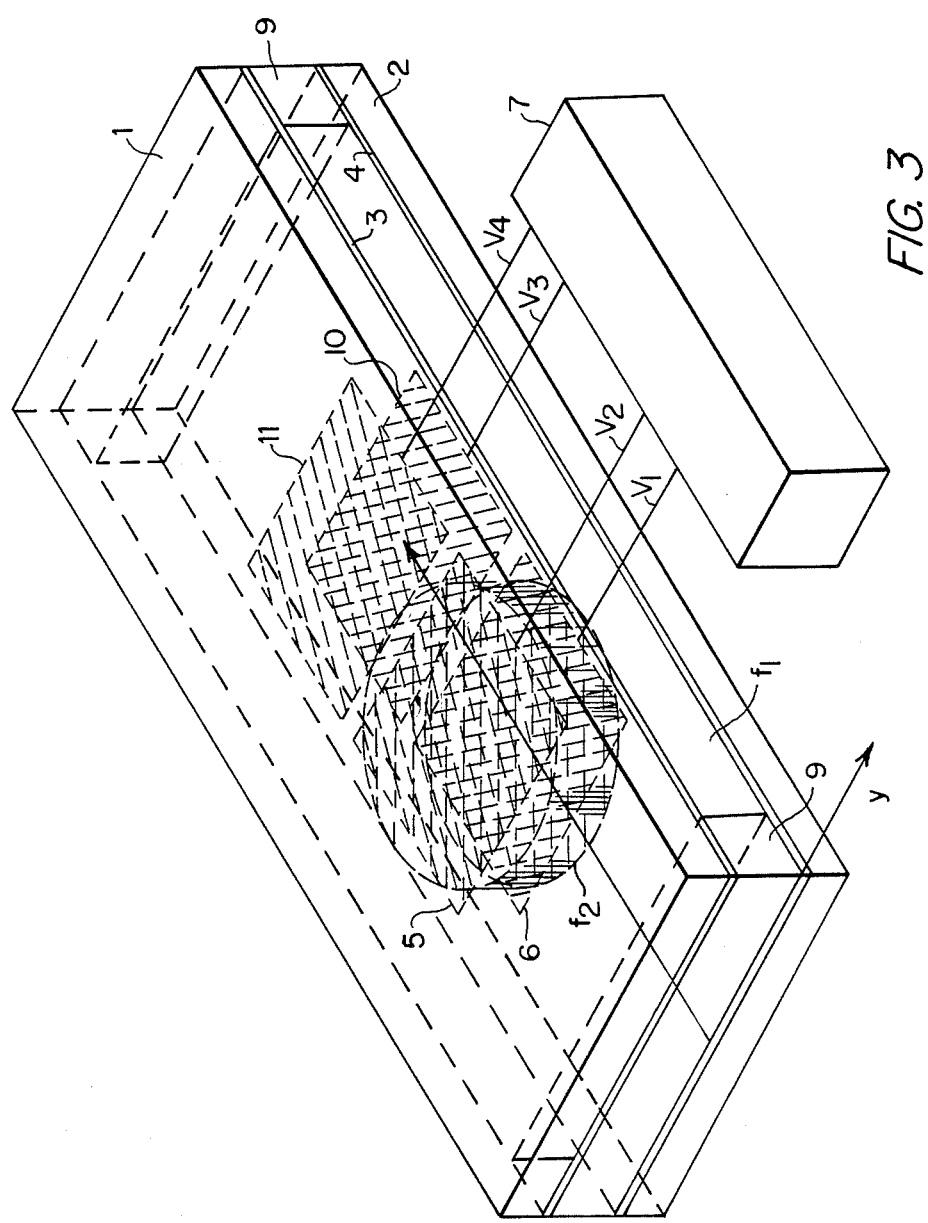
FIG. 3 is an isometric view of an electric control device for the displacement of globules.

The displacement of one or a number of fluid globules from one position to another and the physical origin of the forces which make it possible to produce and control these displacements have been described in French patent Application No. 83 04 745 filed on Mar. 23, 1983. FIGS. 1 to 3 recall the physical explanation given in the cited patent Application.

In its most elementary form which is illustrated in FIG. 1, the electric control device for displacement of a fluid comprises a capillary space having a height e in which two immiscible dielectric fluids are placed together. The capillary space is delimited by two rigid confinement plates 1 and 2 of glass, for example. The value chosen for the height e is equal to or smaller than one millimeter in order to ensure that the capillary forces predominate over the gravitational forces. The internal faces of the plates 1 and 2 have been subjected to a preparation, which consists in suitable cleaning operations and surface deposits 3 and 4 which must prevent any formation of capillary films by the fluid or fluids, the displacement of which is to be controlled electrically. By way of non-limiting example, the capillary space located between the deposits 3 and 4 is occupied by a gaseous fluid or a vapor $f_1$ having a dielectric permittivity $\epsilon_1$. A liquid $f_2$ is introduced into a portion of the volume of the capillary space. The second fluid $f_2$ has a dielectric permittivity $\epsilon_2$ which is higher than $\epsilon_1$ and takes the shape of a globule which extends for example between the abscissae A and B. In order to produce the displacement of the globule $f_2$ in the positive direction of the axis x by electrical means, the internal faces of the plates 1 and 2 are accordingly provided with a pair of electrodes 5 and 6 which are coated in particular with the deposits 3 and 4. These electrodes 5 and 6 which occupy a region located between the displaced abscissae CD are connected to an electric generator 7 which delivers potentials $V_2$ and $V_1$. The difference between these potentials produces volume forces which are equivalent to a motional force F in relation to the interface 8.

The physical origin of the motional force F is explained by the presence within the material media of positive and negative electric charges which can be either free or bound. In the presence of an induction electric field $E_o$, the free charges are capable of moving throughout the material volume which is subjected to the electric field, thus constituting the electrical conduction phenomenon. This phenomenon is not utilized in the field of the present invention although a low level of conductivity of the fluids employed is acceptable. On the other hand, the electric charges bound to the atoms and molecules give rise to electric dipole moments. The material medium reacts to the induction electric field $\vec{E}_o$ by means of an electric polarization $\vec{P}$ which is the sum, in the volume subjected to the field, of the induced dipole moments and of those which are pre-existent by reason of the particular symmetries of the molecules.

This dielectric behavior is expressed by the vector relation $\vec{E} = \vec{E} + \vec{E}'$ where $\vec{E}'$ is the electric field produced by the polarization $\vec{P}$ and $\vec{E}$ is the resultant electric field in the material medium.

The dielectric behavior of a material medium is given by a tensor relation $P_u = X_{uv} E^v$ where $X_{uv}$ is the electric susceptibility tensor. In the case of an isotropic dielectric medium, there is provided a simpler relation $\vec{P} = (\epsilon - \epsilon_o) \vec{E}$ where $\epsilon_o$ is the permittivity of the space and $\epsilon$ is the dielectric permittivity. In this case, the force $\vec{F}$ which is exerted on a medium having a volume v subjected to the field $\vec{E}_o$ is expressed by:

$$\vec{F} = \int_v (\vec{P} \cdot \overrightarrow{\text{grad}}) \vec{E}_o dv. \tag{1}$$

This is a volume force and is larger as the polarization is stronger and as the field gradient is higher.

The application of this relation to heterogeneous media subjected to non-uniform electric fields makes it possible to produce a displacement force of volume origin which is capable of overcoming restoring forces such as surface tension forces.

In the device of FIG. 1, the fluids $f_1$ and $f_2$ are chosen so as to ensure that the resultant electric polarization in the fluid $f_2$ is stronger than that of the fluid $f_1$. Thus the modulus of the force $\vec{F_2}$ calculated by means of relation (1) in the case of the fluid $f_2$ exceeds the modulus of the force $\vec{F_1}$ calculated by means of the same relation in the case of the fluid $f_1$. This produces on the boundary surface 8 of the two fluids an overpressure $p_2$ on the side corresponding to the fluid $f_2$ which is higher than the overpressure $p_1$ on the side corresponding to the fluid $f_1$. The result thereby achieved is the same as if a motional force F were to produce action on the boundary surface 8. On condition that the forces acting in opposition to the motion (that is to say the capillary, surface tension, interfacial tension and viscosity forces) are overcome, the fluid $f_2$ displaces the fluid $f_1$ in order to occupy the portion of volume which is located between the electrodes 5 and 6. This work corresponds to the supply of electric power by the generator 7 which delivers a quantity of electricity q at a potential difference $V_2 - V_1$ since the electrical capacitance of the capacitor formed by the electrodes 5 and 6 has increased whereas the potential difference between the capacitor plates had been maintained constant. In order to provide a clearer understanding of the operation which consists of electrostatic suction of the globule $f_2$ into the interelectrode space, there are shown in FIG. 1 the dashed lines representing the electric field lines together with the electric field vectors $E_1$ and $E_2$ and the positive and negative (+ and −) bound charges produced by polarization of the fluid $f_2$.

FIG. 2 represents the final state. It is apparent that the globule $f_2$ has come to a position in which it occupies the region delimited by the abscissae $A_1$ and $B_1$ which extends symmetrically with respect to the region CD fitted with electrodes. The globule which has been moved into the region $A_1B_1$ can remain captive by reason of the fact that a potential difference $V_2 - V_1$ is maintained.

It is intended that the suppression of the potential difference should allow a restoring force to remain in order to maintain the globule in a captive state within the zone located between the electrodes. The thickness of the deposits 3 and 4 is in fact sufficiently small to ensure that the molecular forces produce action between the material of the elecrodes 5 and 6 and the fluid $f_2$ in order to fix this latter in the location illustrated in FIG. 2. The generator 7 is not capable of dislodging the globule $f_2$ from the capture zone to which it has moved.

Reversibility of displacement of a globule can be contemplated by means of special electrode arrangements.

In FIG. 3, there is shown an isometric view of a device for electrical control of globule displacement. The same references designate the same elements as in FIGS. 1 and 2. The plates 1 and 2 are separated by spacer members 9 and there is shown a second pair of electrodes 10 and 11 which follows the pair of electrodes 5 and 6 in the direction of the axis x. The electric generator 7 supplies potentials $V_3$ and $V_4$ to the electrodes 10 and 11. FIG. 3 shows in dashed outline the circular contour of a fluid globule $f_2$ which is capable of moving within the area of the plane x-y. By way of example, the electrodes 5, 6, 10 and 11 have the shape of a square, the length on each side of the square being within the range of 100 microns and 100 millimeters. The space members 9 have a height of 5 to 10 microns and the space between the electrode 5 and the electrode 11 has a width of 20 microns. The fluid $f_1$ which surrounds the globule $f_2$ is air and the fluid $f_2$ is selected from the hydrocarbons such as alkanes containing 5 to 25 atoms of carbon, ketones (acetone, cyclohexanone, methylethylketone) or nitro derivatives (nitrobenzene, nitrotoluene). The use of liquid mixtures in order to form the fluid of type $f_2$ makes it possible to control the surface tension, to prevent dislocation of the globules at the time of their displacement and to optimize the time of response of the device to electric control operations.

The electric generator 7 is capable of delivering potential differences $V_2-V_1$ and $V_4-V_3$ of the order of 100 to 300 volts in order to produce electric displacement fields of the order of $5 \times 10^6$ to $6 \times 10^7$ volts per meter. The volume of the globule of fluid $f_2$ compressed between the plates 1 and 2 is calibrated in such a manner as to project to a slight extent beyond the contour of the electrodes 5 and 6 but could also be increased so as to encroach upon the pair of electrodes 10 and 11.

In order to transfer the globule $f_2$ from the interelectrode space 5, 6 to the interelectrode space 10, 11, the potential difference $V_2-V_1$ is nullified or reduced and the potential difference $V_4-V_3$ is established. There is thus produced a forward-displacement step in the positive direction of the axis x. In order to return the globule to its initial position, it is necessary to nullify or reduce the potential difference $V_4-V_3$ and to restore the potential difference $V_2-V_1$. If the two potential differences are applied at the same time, the globule does not tend to move but if it projects beyond a set of electrodes, it may undergo a deformation in an endeavor to conform as closely as possible to the sum of areas of the electrodes 5 and 11.

Figure 4A:
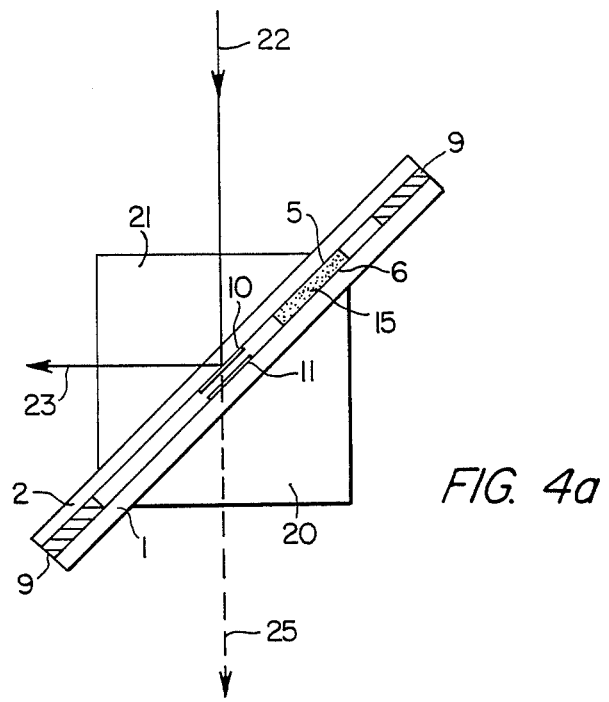
FIGS. 4a and 4b are explanatory diagrams.
Figure 4B:
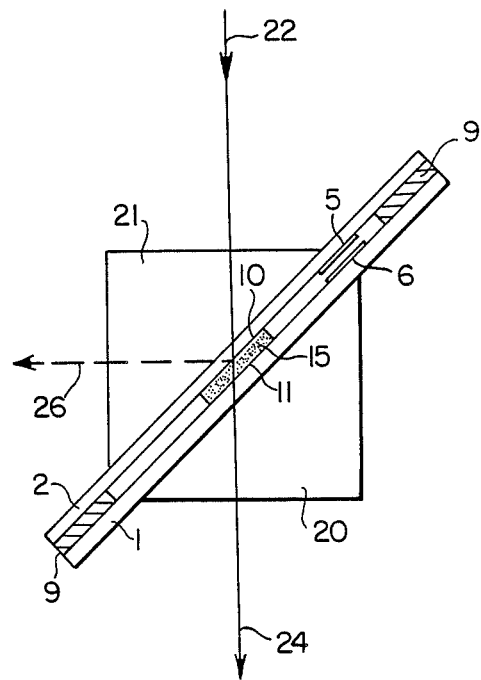

FIG. 4 is a schematic sectional view of an optical switcing device in accordance with the invention. FIG. 4 is made up of two parts 4a and 4b which show the modification of the path of an incident light beam of the device as a function of the presence or absence of a globule on said path. In FIGS. 4a and 4b, the device is shown in transverse cross-section. The optical switching device comprises the globule displacement device of FIG. 3 in which the same references designate the same elements. The electrodes 5, 6, 10 and 11 consist of a layer of transparent material such as a mixed oxide of tin and indium, for example, and are connected to voltage generators in accordacne with the principle taught in FIG. 3. The device for displacing globules further comprises surface deposits (not shown in the drawings) which prevent formation of capillary films by the fluid to be displaced. The globule 15 to be displaced is a liquid chosen from the hydrocarbons mentioned earlier. The second fluid of the device can simply consist of air.

Total reflection prisms 20 and 21 are cemented to the external faces of the glass plates. The cementing operations are carried out so as to produce index matching between the prisms 20 and 21 and the plates 1 and 2. A light beam 22 is directed toward the electrode 10 at an oblique angle of incidence. The obliquity of the beam 22 is chosen so as to permit the possibility of total reflection from the internal face of the plate 2. The beam passes through the prism 21 and reaches the internal face of the plate 2. Two cases can then arise according to the nature of the fluid located between the electrodes 10 and 11.

The light beam 22 is reflected so as to form a beam 23 when the volume controlled by the electrodes 10 and 11 is occupied by a gas such as air having a refractive index of the order of 1 whereas the refractive index of the glass of plate 2 is of the order of 1.5. This is shown in FIG. 4a.

If the volume controlled by the electrodes 10 and 11 is occupied by the globule 15 which is initially located between the electrodes 5 and 6, the refractive index of this region changes to a value which is typically within the range of 1.4 to 1.7. Under these conditions, the total reflection from the internal face of the glass plate 2 is suppressed and the beam 22 is transmitted in the form of a beam 24 as shown in FIG. 4b.

In the case if FIG. 4a, extinction in the direction 25 is less than $10^{-4}$ of the intensity of the incident beam 22 and the intensity of the reflected beam 23 represents 90% of the intensity of the beam 22. In the case of FIG. 4b, extinction in the direction 26 is of the order of $5 \times 10^{-3}$ of the intensity of the incident beam 22 and the intensity of the transmitted beam 24 represents 90% of the intensity of the beam 22.

Antireflection surface treatments and index matching (especially between the glass plates and the transparent electrodes which usually have a refractive index equal to or higher than 2 and between these electrodes and the fluid to be displaced) permit improved extinction in the direction 25 in the case of FIG. 4a and enhanced beam transmission in the case of FIG. 4b. Matching of the thickness of the transparent electrodes also contributes to this result. It should be pointed out that the prism 21 is not indispensable in either of the two cases considered in the figure. The prism does have the effect, however, of improving the conditions of transmission of the incident light beam by eliminating parasitic reflections. On the other hand, the prism 20 is indispensable if it is desired to transmit a light beam in the direction 25. For the same reasons, it is an advantage to ensure that the prisms have faces which are perpendicular to the entering and emerging light beams.

The foregoing therefore constitutes an optical switching device in which a light beam can be sent in two possible directions which are both clearly defined.

Figure 5:
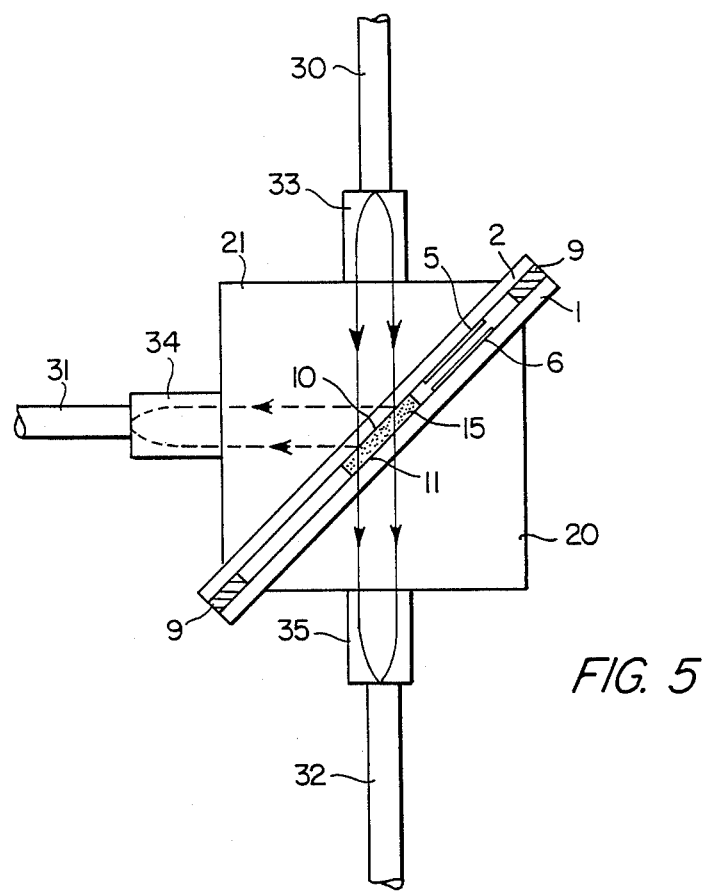
FIGS. 5 and 6 illustrate optical switching device in accordance with the invention.

FIG. 5 illustrates an optical switching device in accordance with the invention in which the light beams are carried by optical fibers. The operation of this device is exactly as described with reference to FIG. 4 and the same references designate the same elements. Since the prisms 20 and 21 have a cross-section in the shape of a right-angled isosceles triangle, the light beams enter and emerge from the device at right angles to the corresponding prism faces. The optical fiber 30 is an incident fiber for propagating the light beam which is intended to be either transmitted or reflected. A reflected beam is collected by the receiving fiber 31 whereas a transmitted beam is collected by the receiving fiber 32. The light beams are collimated by lenses 33, 34, 35 of the graded-index type which are cemented to the prisms. In this figure, the full lines represent the path of a transmitted beam (when the globule 15 is located between the electrodes 10 and 11) and the dashed lines represent the path of a reflected beam (when the globule 15 is located between the electrodes 5 and 6). It would also be possible to conceive a device without glass plates in which the electrodes could be deposited directly on the internal faces of the prisms.

Figure 6:
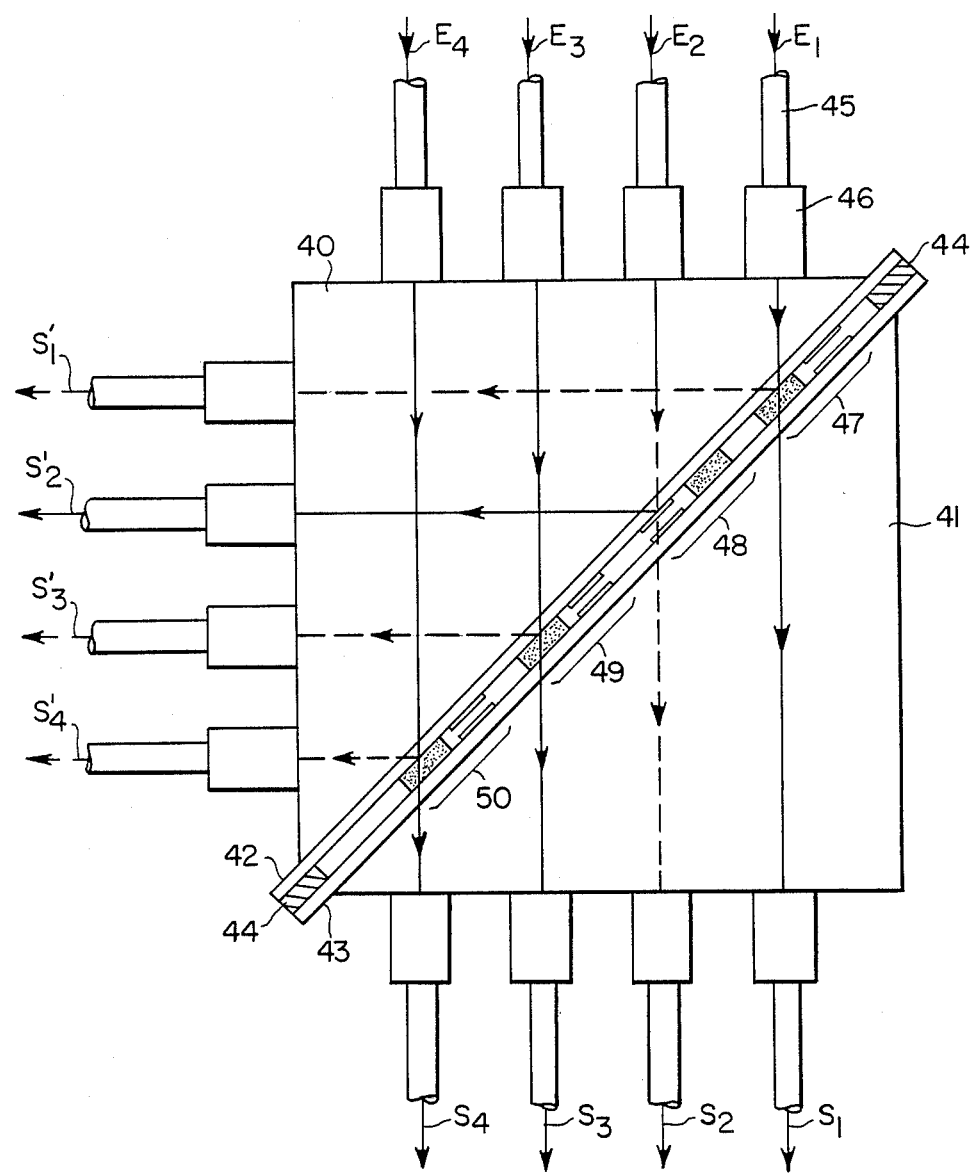

It is within the scope of the invention to provide a plurality of beam entrance channels and exit channels within the same device. FIG. 6 illustrates a device for switching four light beams in which provision is made for four entrance channels and eight exit channels. The device is constituted by two parallel glass plates 42 and 43 separated by a thin layer of air by means of spacer members 44. In contrast to the devices described in the foregoing, the device of FIG. 6 comprises four switching groups 47, 48, 49 and 50. Each group comprises two sets of electrodes which are capable of initiating the displacement of a fluid globule under the influence of a potential difference. The characteristics of each group and their operation have been described earlier. Total reflection prisms 40 and 41 having a cross-section in the shape of a right-angled isosceles triangle are cemented to each plate 42 and 43. The entrance channels $E_1$, $E_2$, $E_3$ and $E_4$ are constituted by optical fibers 45 associated with lenses 46 of the graded-index type. A transmission exit channel $S_1$, $S_2$, $S_3$ and $S_4$ and a reflection exit channel $S'_1$, $S'_2$, $S'_3$ and $S'_4$ correspond respecively to each entrance channel. The exit channels as well as the entrance channels are constituted by optical fibers associated with graded-index lenses. By way of example, there are shown in full lines three light beams directed from the entrances $E_1$, $E_3$ and $E_4$ to the exits $S_1$, $S_3$ and $S_4$, and a beam directed from the entrance $E_2$ to the exit $S'_2$. These directions are imposed by the presence or absence of a globule as represented by a shaded area in the path of the light beams. The paths imposed on the beams in the event of displacement of the globules are shown in dashed lines. In this case, the beams entering at $E_1$, $E_2$, $E_3$ and $E_4$ would be directed respectively toward the exits $S'_1$, $S'_2$, $S'_3$ and $S'_4$. The beam paths, shown in full in dashed lines in FIG. 6 define a plane, the plane of the illustration. The fluid globules move under the influence of selected potentials within the plates 42 and 43. Motion of the globules within the plane of the illustration is effective to alter the path of the incident light beams as described.

Other configurations can be contemplated for the practical realization of optical switching devices based on the principle of displacements of fluids. Depending on particular requirements, it would be possible to devise systems in which the optical beams are influenced several times along their path of travel by the presence or absence of globules.

Figure 7:
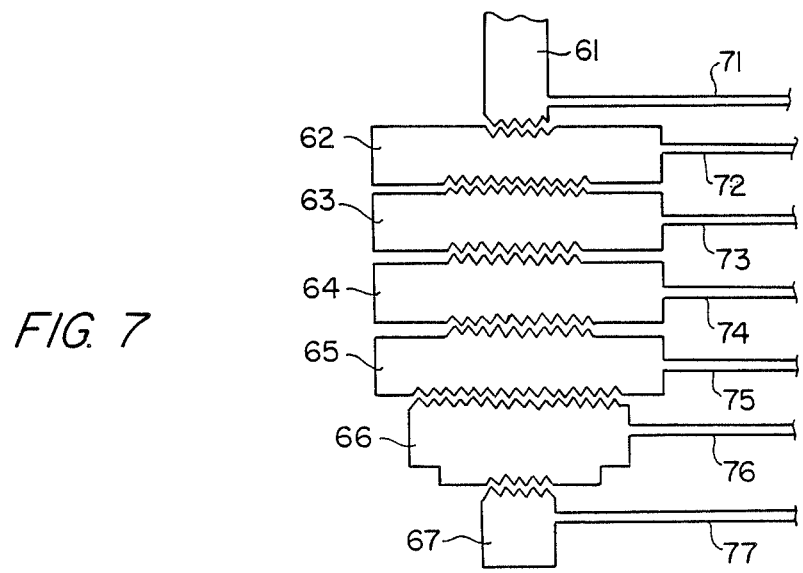
FIG. 7 illustrates a configuration of electrodes.

It is an advantage to give the electrodes a geometry which permits rapid and efficient displacement of the globules. FIG. 7 shows one example of geometry of electrodes which permits formation of a liquid globule in a particular region of the device in which it is desired to modify the conditions of propagation of a light beam. An optical switching element can be obtained by placing two sets of electrodes of this type in oppositely-facing relation. Each set of electrodes comprises seven conducting segments designated by the reference numerals 61 to 67 and connected to voltage generators by means of a corresponding number of conductors designated by the reference numerals 71 to 77. The connections to the generators are established in such a manner that a potential difference can appear between segments located opposite to each other. The segments 61 to 66 and the corresponding segments located in opposite relation make it possible to control the volumes which serve as fluid reservoirs. The segment 67 and the opposite segment permit displacement of the fluid on the path of an incident light beam by application of a suitable potential difference and therefore of an electric field. When the potential difference between these segments is suppressed and a potential difference is applied between the segments 61 to 66 and the opposite segments, the surface tension forces and the forces produced by the electric fields perform the function of restoring forces and cause withdrawal of the fluid outside the path of the light beam. This withdrawal is complete and rapid when the volumes defined by the segments 61 to 66 and their opposite segments are only partially filled. The values of the differences in potential between the fluid withdrawal segments can be identical or stepped.

In order to achieve a further improvement in the transfer of fluids under the influence of an electric field gradient, it is an advantage to provide the different successive segments with sets of teeth. In FIG. 7, the sets of teeth are shown in the form of sawteeth. Since the segments are interengaged by means of their sets of teeth, the transfer of globules is facilitated to an appreciable extent.

FIG. 8 is a schematic diagram showing a device for the composition of a line of luminous points based on optical switching by displacement of globules. FIG. 8 consists of two views of the same device, namely a front view in FIG. 8a and a top view in FIG. 8b. The device comprises two total-reflection prisms 80 and 81 having a cross-section in the shape of a right-angled isosceles triangle, said prisms being cemented to two plates 82 and 83 separated by spacer members 84. The plates 82 and 83 each support two rows of electrodes connected to voltage generators. The rows of electrodes 86 and 87 are represented schematically in FIG. 8b by dashed lines. The globules which are capable of undergoing displacements from one row 86 to a row 87 and conversely are represented by small black squares such as the square 85. The location reserved for a globule is considered as forming an elementary point which is intended to be employed in the composition of a line of points. By way of example, the row 87 will serve to compose the desired line of points. An incident sheet of light radiation 88 illuminates the orw 87 in the direction of a projection plane 89. Depending on the presence or absence of globules arising from an electric control operation, the elementary points either interrupt or transmit portions of the sheet of light radiation in the form of beams which produce an image on the projection plane 89 after passing through a suitable optical element. The points of the row 87 which are characterized by the presence of blobules permit transmission of the light beams. On the other hand, when no globules are present, the light rays are reflected from the plate 82 in the direction 90. The optical projection element can consist of a collecting lens 91 for condensing and transmitting the light to a projection objective 92 which produces an image on the projection plane 89 by combination of the projected points 93.

The composing device in accordance with the invention offers a number of advantages. In the first place, the light source which produces the sheet of light radiation can be an ordinary lamp and not necessarily a laser as in certain types of apparatus of the prior art by virtue of the fact that the optical efficiency is excellent and does not call for monochromatic light. Furthermore, since a series of pairs of transparent electrodes arranged in a row is illuminated by the sheet of light via a longitudinal prism, the length of the row can be equal to that of the line to be reproduced, thus simplifying the optical system. Finally, it is possible to utilize the rays reflected from the prism 80 in order to collect a negative of the imagery of the projection plane.

The composition of the line of points can serve to illuminate photosensitive devices for point-by-point reproduction of images by means of processes such as photography, photocopying remote copying, and so on.

What is claimed is:

1. A device for optically switching at least one incident optical beam between at least first and second exit paths comprising:
   first and second fluids contained within a confinement space defined by a pair of transparent elements,
   electrically controlled switching means for placing into a path of said incident optical beam either the first fluid for producing reflection of the optical beam into said first exit path or the second fluid which does not produce a reflection so that the optical beam travels over the second exit path, the first and second fluids being immiscible and having different dielectric permittivities, one of the fluids having a globular structure embedded in interstitial structure of the other fluid,
   said electrically controlled switching means including means for generating an electric field gradient in order to cause the fluid having the higher permittivity to converge toward a region of the confinement space which is subjected to the electric field gradient,
   wherein said first fluid is air and the second fluid is a hydrocarbon.

2. A device as recited in claim 1 wherein said second fluid is an alkane with 5 to 25 carbon atoms per molecule.

3. A device as recited in claim 1 wherein said second fluid is a ketone.

4. A device as recited in claim 1 wherein said second fluid is acetone.

5. A device as recited in claim 3 wherein said second fluid is cyclohexane.

6. A device as recited in claim 3 wherein said second fluid is methylethylketone.

7. A device as recited in claim 1 wherein said second fluid is a nitro derivative.

8. A device as recited in claim 1 wherein said switching means includes electrodes adjacent said transparent electrodes coated with a non-wettable coating.

9. A device as recited in claim 8 wherein said electrodes have an inter-engaging form.

10. A device for optically switching at least one incident optical beam between at least first and second exit paths comprising:
    first and second fluids contained within a confinement space defined by a pair of transparent elements,
    electrically controlled switching means for placing into a path of said incident optical beam either the first fluid for producing reflection of the optical beam into said first exit path or the second fluid which does not produce a reflection so that the optical beam travels over the second exit path, the first and second fluids being immiscible and having different dielectric permittivities, one of the fluids having a globular structure embedded in interstitial structure of the other fluid,
    said electrically controlled switching means including means for generating an electric field gradient in order to cause the fluid having the higher permittivity to converge toward a region of the confinement space which is subjected to the electric field gradient,
    wherein said switching means include electrodes adjacent said transparent elements, said electrodes coated on a surface not adjacent said transparent elements with a non-wettable coating.

11. A device as recited in claim 10 wherein said electrodes have inter-engaging form.

12. A device as recited in claim 11 wherein said second fluid is a hydrocarbon.

13. A device for optically switching at least one incident optical beam between at least first and second exit paths comprising:
    first and second fluids contained within a confinement space defined by a pair of transparent elements,
    electrically controlled switching means for placing into a path of said incident optical beam either the first fluid for producing reflection of the optical beam into said first exit path or the second fluid which does not produce a reflection so that the optical beam travels over the second exit path, the first and second fluids being immiscible and having different dielectric permittivities, one of the fluids having a globular structure embedded in interstitial structure of the other fluid,
    said electrically controlled switching means including means for generating an electric field gradient in order to cause the fluid having the higher permittivity to converge toward a region of the confinement space which is subjected to the electric field gradient,
    wherein said switching means includes electrodes adjacent said transparent elements having an inter-engaging form.

14. A device as recited in claim 13 wherein said electrodes have a non-wettable coating.

15. A device as recited in claim 13 wherein said second fluid is a hydrocarbon.

16. A device for optically switching plural incident optical beams between at least first and second exit paths for each incident beam, comprising:
    first and second fluids contained within a confinement space defined by a pair of transparent elements,
    electrically controlled switching means for placing into a path of each said incident optical beam either the first fluid for producing reflection of the optical beam into said first exit path or the second fluid which does not produce a reflection so that the optical beam travels over the second exit path, the first and second fluids being immiscible and having different dielectric permittivities, one of the fluids having a globular structure embedded in interstitial structure of the other fluid, said electrically controlled switching means including means for generating an electric field greadient in order to cause the fluid having the higher permittivity to converge toward a region of the confinement space which is subjected to the electric field gradient, wherein said switching means produces movement of said fluids in said confinement space in a direction defined by a plane within which said incident optical beams lie, and wherein said second fluid is a hydrocarbon.

17. A device for optically switching plural incident optical beams between at least first and second exit paths for each incident beam, comprising:

first and second fluids contained within a confinement space defined by a pair of transparent elements, electrically controlled switching means for placing into a path of each said incident optical beam either the first fluid for producing reflection of the optical beam into said first exit path or the second fluid which does not produce a reflection so that the optical beam travels over the second exit path, the first and second fluids being immiscible and having different dielectric permittivities, one of the fluids having a globular structure embedded in interstitial structure of the other fluid, said electrically controlled switching means including means for generating an electric field gradient in order to cause the fluid having the higher permittivity to converge toward a region of the confinement space which is subjected to the electric field gradient, wherein said switching means produces movement of said fluids in said confinement space in a direction defined by a plane within which said incident optical beams lie, and wherein said switching means includes electrodes with a non-wettable coating.

18. A device for optically switching plural incident optical beams between at least first and second exit paths for each incident beam, comprising:

first and second fluids contained within a confinement space defined by a pair of transparent elements, electrically controlled switching means for placing into a path of each said incident optical beam either the first fluid for producing reflection of the optical beam into said first exit path or the second fluid which does not produce a reflection so that the optical beam travels over the second exit path, the first and second fluids being immiscible and having different dielectric permittivites, one of the fluids having a globular structure embedded in interstitial structure of the other fluid, said electrically controlled switching means including means for generating an electric field gradient in order to cause the fluid having the higher permittivity to converge toward a region of the confinement space which is subjected to the electric field gradient, wherein said switching means produces movement of said fluids in said confinement space in a direction defined by a plane within which said incident optical beams lie, and wherein said switching means includes electrodes of inter-engaging form.

* * * * *

UNITED STATES PATENT AND TRADEMARK OFFICE
CERTIFICATE OF CORRECTION

PATENT NO. : 4,818,052

DATED : April 4, 1989

INVENTOR(S) : Jean-Pierre LePesant, et al.

It is certified that error appears in the above-identified patent and that said Letters Patent is hereby corrected as shown below:

Column 1, line 47, change "elecric" to --electric--.

Column 2, line 15, change "including" to --inducing--.

Column 2, line 33, change "device" to --devices--.

Column 2, line 66, change "be" to --by--.

Column 3, line 62, change "$\vec{E}=\vec{E}+\vec{E}'$" to --$\vec{E}+\vec{E}_o+\vec{E}'$--

Column 4, line 33, change "the" to --that--.

Column 4, line 62, change "elecrodes" to --electrodes--.

Column 5, line 62, change "accordacne" to --accordance--.

Column 6, line 58, change "flbers" to --fibers--.

Column 7, line 31, change "respecively" to --respectively--.

Column 8, line 53, change "orw" to --row--.

Column 8, line 61, change "blobules" to --globules--.

Column 9, line 18, insert a comma (,) after "photocopying".

UNITED STATES PATENT AND TRADEMARK OFFICE
CERTIFICATE OF CORRECTION

PATENT NO. : 4,818,052

DATED : April 4, 1989

INVENTOR(S) : Jean-Pierre LePesant, et al.

It is certified that error appears in the above-identified patent and that said Letters Patent is hereby corrected as shown below:

Column 11, line 4, change "greadient" to --gradient--.

Signed and Sealed this

Ninth Day of January, 1990

Attest:

JEFFREY M. SAMUELS

*Attesting Officer*  *Acting Commissioner of Patents and Trademarks*